(12) United States Patent
Schmitz et al.

(10) Patent No.: US 10,318,814 B2
(45) Date of Patent: Jun. 11, 2019

(54) FRAMEWORK FOR COMBINING CONTENT INTELLIGENCE MODULES

(71) Applicant: ADOBE INC., San Jose, CA (US)

(72) Inventors: Martin Schmitz, Braunschweig (DE); Hartmut Warncke, Hamburg (DE); Sven Winter, Hamburg (DE)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 14/817,189

(22) Filed: Aug. 3, 2015

(65) Prior Publication Data

US 2016/0055380 A1     Feb. 25, 2016

Related U.S. Application Data

(63) Continuation of application No. 12/573,319, filed on Oct. 5, 2009, now Pat. No. 9,098,758.

(51) Int. Cl.
*H04N 21/234* (2011.01)
*G11B 27/00* (2006.01)
*G06F 16/783* (2019.01)
*G06K 9/00* (2006.01)
(Continued)

(52) U.S. Cl.
CPC ....... *G06K 9/00744* (2013.01); *G06F 16/783* (2019.01); *G06F 16/7867* (2019.01); *G06K 9/00973* (2013.01); *G11B 27/002* (2013.01); *H04N 21/23418* (2013.01); *H04N 21/8547* (2013.01)

(58) Field of Classification Search
USPC .......................................... 707/914; 715/723
See application file for complete search history.

(56) References Cited

U.S. PATENT DOCUMENTS 6,049,870 A * 4/2000 Greaves ............. G01R 31/3004
                                                          348/E5.051
6,782,539 B2 * 8/2004 Gould ................. G06F 9/44526
                                                              719/310
(Continued)

OTHER PUBLICATIONS

Non-Final Office Action dated Aug. 30, 2011 in U.S. Appl. No. 12/573,319, 17 pages.
(Continued)

*Primary Examiner* — Cheyne D Ly
(74) *Attorney, Agent, or Firm* — Shook, Hardy & Bacon L.L.P.

(57) ABSTRACT

A method for analyzing media assets such as video and audio files. The method includes providing access to all the frames of a digital media asset. The method includes, with a microprocessor, running a raw analyzer modules to analyze the asset frames to produce sets of raw analyzer result data that are stored in a data cache in a file associated with the asset. The sets of raw analyzer results are linked to the raw analyzer modules with unique identifiers. The digital media asset is played for the raw analyzer modules, which concurrently analyze the temporally-related frames. The raw analyzer results are stored as data tracks that include metadata for the asset such as immutable parameters including histograms. The method includes using a feature algorithm module to generate an analysis result, such as face identification, for the digital media asset based on the raw analyzer results accessed by the identifiers.

20 Claims, 5 Drawing Sheets

(51) Int. Cl.
*G06F 16/78* (2019.01)
*H04N 21/8547* (2011.01)

(56) References Cited

U.S. PATENT DOCUMENTS

| | | | | |
|---|---|---|---|---|
| 2002/0085754 | A1* | 7/2002 | Schoepflin | G06T 7/0083 |
| | | | | 382/173 |
| 2005/0038814 | A1* | 2/2005 | Iyengar | G06F 17/30038 |
| 2005/0271251 | A1* | 12/2005 | Russell | G06K 9/00288 |
| | | | | 382/103 |
| 2006/0204107 | A1 | 9/2006 | Dugan | |
| 2007/0291118 | A1* | 12/2007 | Shu | H04N 7/18 |
| | | | | 348/156 |
| 2009/0094113 | A1* | 4/2009 | Berry | G06F 17/30017 |
| | | | | 705/14.73 |

OTHER PUBLICATIONS

Final Office Action dated Jan. 26, 2012 in U.S. Appl. No. 12/573,319, 18 pages.
Non-Final Office Action dated Sep. 4, 2013 in U.S. Appl. No. 12/573,319, 21 pages.
Final Office Action dated May 22, 2014 in U.S. Appl. No. 12/573,319, 22 pages.
Notice of Allowance dated Feb. 25, 2015 in U.S. Appl. No. 12/573,319, 9 pages.

* cited by examiner

FRAMEWORK FOR COMBINING CONTENT INTELLIGENCE MODULES

CROSS-REFERENCE TO RELATED APPLICATIONS

This application is a continuation of, and claims priority to, U.S. patent application Ser. No. 12/573,319, filed Oct. 5, 2009, entitled "FRAMEWORK FOR COMBINING CONTENT INTELLIGENCE MODULES," which is incorporated herein by reference in its entirety.

BACKGROUND

Field of Description

The present disclosure relates, in general, to computer-implemented methods for running content intelligence algorithms or software modules on digital media assets such as video images, and, more particularly, to improved methods and systems for combining content intelligence modules and output/results of such content intelligence modules for more effective use by applications.

Relevant Background

Recently, there have been many advances in software algorithms or modules that are useful in analyzing digital media to provide information about the media. For example, a digital asset, such as a frame of a video source or a digital image, may be analyzed with a computer application to automatically determine whether the asset includes a human face. If so, another application or module may act to determine whether the face belongs to a specific person, which may have numerous uses such as searching for images of a particular person in large asset sets such as video or image databases accessible via the Internet or to determine from surveillance cameras whether a suspected criminal has been in proximity of a particular camera location. Other algorithms or software modules may be used to provide other information such as facial expression, activity in a frame or image, a shot in a video, a brightness level of an image, and/or other specific information for a media asset. This collection of algorithms or modules may be labeled content intelligence modules or algorithms.

In general, each content intelligence algorithm is created to perform a particular task or function with relation to a media asset. Each content intelligence algorithm such as a face identifier algorithm for use with still images may output a set of result or output data. Unfortunately, most content intelligence algorithms do not return data that can be used directly as a feature or the like. Instead, the content intelligence data or results have to be post-processed to be useful, and often the post-processing further requires that the data from differing algorithms be combined to be used, e.g., brightness levels on their own may not be useful, activity identified in an image may not be useful without further data, and so on. Another reason that the content intelligence results often have to be post-processed and combined is that each content intelligence algorithm provides its output in the context of their specific environment. It is left up to another application or another content intelligence module to determine that context to properly use the results, which may make it difficult to properly combine or build upon the results of another content intelligence algorithm.

SUMMARY

Developing content intelligence software modules to provide desired artificial intelligence and analysis of media data is a challenging task. Combining a number of content intelligence algorithms in a relatively hardwired or orderly manner has not been adequately achieved and has presented numerous obstacles, which are heightened and emphasized when any change is later performed or implemented.

The following description provides methods and systems that allow quick and effective combination of content intelligence (CI) algorithms or modules in an orderly way. This combination allows the CI modules to support each other to use the functionality and results/outputs of other CI modules to generate collaborative and/or improved results (e.g., post-processing of CI module results or data is enhanced and simplified). The CI framework or toolkit may be thought of as a software framework that facilitates the combination of various CI modules or algorithms to form features (outputs or results of combined functioning of two or more CI modules) that can then be used by one or more media analysis/processing applications. The CI framework may be adapted to provide a generic interface that can be used by such applications to obtain the results of the CI modules and/or features.

More particularly, a computer-implemented method is provided for analyzing a media asset such as a video or audio file. The method includes providing sequential access to a plurality of portions of a digital media asset (with "sequential" being intended to convey that the portions are generally played in their time-related sequence or order but a raw analyzer may request more than one and/or review the portions out of order). The method also includes, with a microprocessor, running a plurality of raw analyzer modules (RAs) to analyze the portions of the digital media asset to produce sets of raw analyzer result data. The method also may include storing in a data cache or data store the sets of raw analyzer result data in a file that is associated with the digital media asset (e.g., typically one data cache file per asset). Each of the sets of raw analyzer result data may be linked to a particular one of the raw analyzer module such as with a single unique identifier (UID).

In some embodiments, the digital media asset comprises an audio or video file that is played in its entirety for the RAs, which may concurrently (at least partially) analyze the temporally-related frames of the file (which may include timestamps indicating their time relationships). In an implementation of the method, the RA results are stored as data tracks that provide metadata for the frames of the video/audio file that are extracted by an associated one of the RAs. The results or metadata may be associated with the proper frame using the timestamps found in the video/audio file. The extracted metadata may include substantially immutable properties or parameters for the content of the video/audio file (e.g., histograms or the like).

The method may also include running, with a microprocessor, a feature algorithm module (FA) to generate a feature or analysis result (such as shot/scene determination or face/logo/object identification) for the digital media asset based on or by using one or more of the sets of raw analyzer result data from the data cache. For example, the RA result data may be accessed by the FA by providing or using a UID associated with a particular one of the RAs, and, in some embodiments, the particular RA and the calling FA are provided within a plugin run by a microprocessor (e.g., as part of a content intelligence (CI) framework or toolkit). In some cases, the method may include a microprocessor running an additional/second FA that creates an additional/second analysis result for the asset based on the analysis results of the first FA and/or one or more of the RA result sets or data tracks (which may be the same or different than the RA result sets used by the first FA).

DETAILED DESCRIPTION

Figure 1:
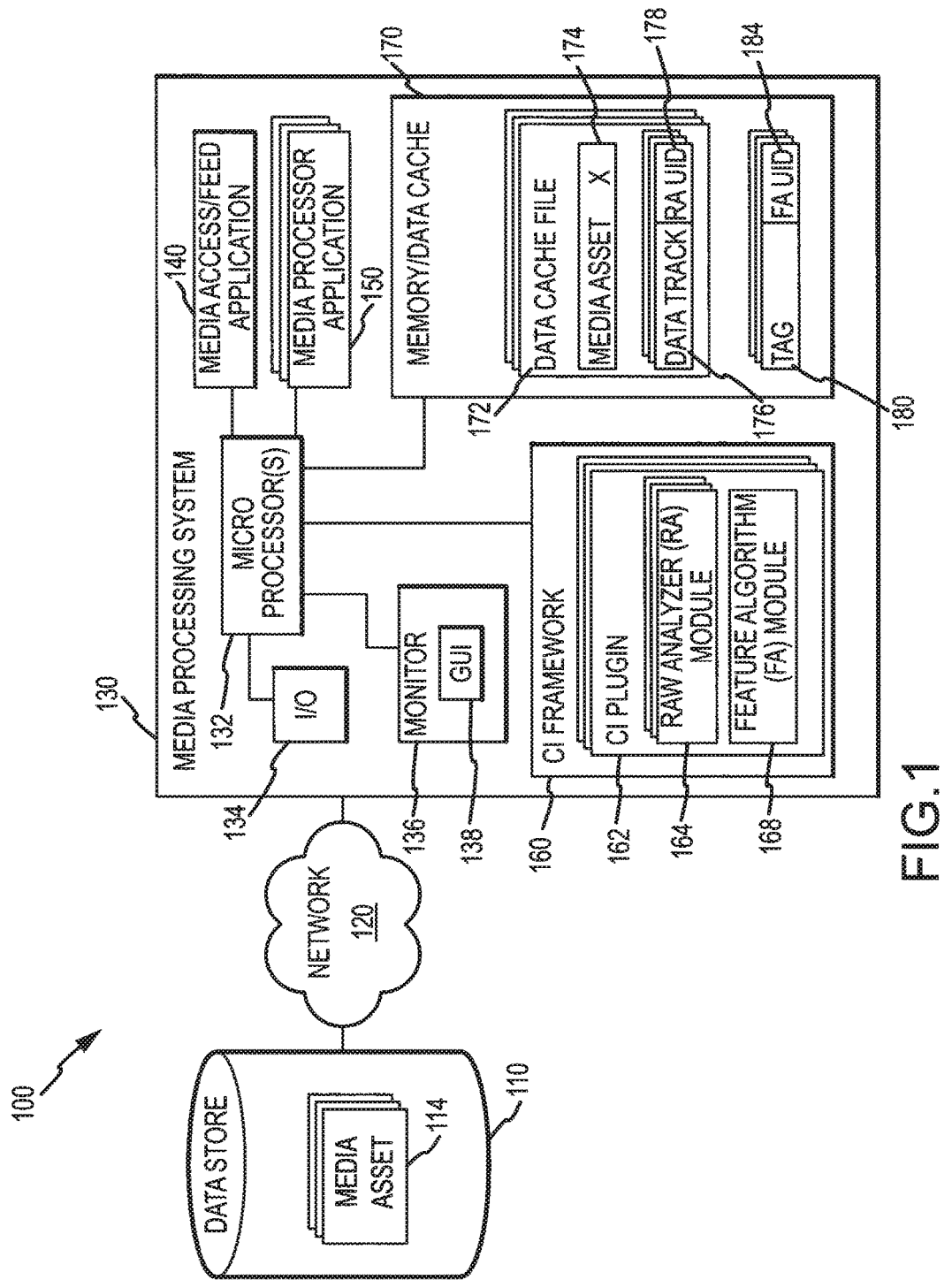
FIG. 1 illustrates in functional block form a computer system implementing media processing or analysis of media assets using a content intelligence toolkit or framework including use of plugins with raw analyzer (RA) and feature algorithm (FA) modules.

The following description describes the use of software (and/or hardware) implementations to provide a content intelligence toolkit that provides a software framework that combines a number of content intelligence (CI) algorithms or modules (e.g., raw analyzers or RAs) so as to form features or feature algorithms or modules (FAs), which can, in turn, be used (or their results/outputs used) by media analysis/processing applications or other applications. In brief, the CI framework described provides a number of RAs, and, during operation, a media asset or media data such as a video file may be processed by the RAs to generate a set of content data that is stored in memory. For example, a video file may be played in its entirety and information may be extracted by each RA during this playing of the file to create data cache files for the media asset. Such information may be stored as data tracks in the data cache file of the asset with each data track time stamped and linked to the producing RA by a unique identifier. A set of FAs may then take the input of the RAs (or select ones of the RAs) and produce a feature result that may be stored as a tag that is associated with the media asset and with the producing FA (such as by another unique identifier). An application such as Adobe's PhotoShop or other media analysis/processing application may access the tags or FA outputs to further analyze or process data (metadata) associated with the media asset.

In this description, it may be useful to provide definitions for a number of several terms/acronyms. For example, content intelligence or: CI is a relatively general terms that is used to describe any software/hardware tool or module that is used to analyze or make use of the analysis of content of a media asset such as temporal media (e.g., audio and/or video files of digital data) or still media (e.g., images or still image files). A content intelligence toolkit (CIT) or CI framework is a collection of shared software components or modules that bring basic CI functionality to implementers and users of CI features to process media assets.

The term unique identifiers or UIDs is used to refer to certain objects or classes of objects. For example. UIDs may be used to identify a raw analyzer data track for a media asset or a feature algorithm tag. In this regard, a raw analyzer (RA) is a software module (which may be provided as part of a plugin with an FA module) that functions when run by a microprocessor to extract properties or information (e.g., immutable properties) from media assets such as histogram data from video or audio frames. Output data of an RA may be stored in a data cache as a data cache file for each asset, with the RA and its output data being linked (such as by use of the same UID or the like). A feature algorithm or FA is a software module that can be run by a microprocessor to turn or modify data from the data cache file (e.g., RA data or data tracks generated from an RA module) into a list of tags with this FA output being linked to the FA (such as by use of single UID for the tag (or type of tag) and the FA module). A "tag" in this sense is a product or output of a feature algorithm or FA module and may be used to describe a segment of footage or a media asset where a certain description applies (e.g., "Scene number 1 ranges from 0.0 to 3.12 seconds" or the like), and the tag may be stored in the data cache or in a separate data store such in XMP. The data cache may be a data storage or memory that is used to store time-stamped data from RA modules for fast retrieval. In practice, one cache file may be written per media asset that is processed by the CI framework. Multiple data tracks may exist within a media asset cache file for data from different RA modules that extracted information or properties from the media asset (with each data track addressed by a UID associated with an RA module). Each data track may include a list of time stamped samples of binary data of one type (e.g., associated with one UID for an RA module), and several data tracks form one data cache file. A plugin may be code executable by a microprocessor that includes one or more RA modules and one or more FA modules that are used in combination to provide or implement a CI feature.

FIG. 1 illustrates a computer system or network 100 as may be used by an operator to process or analyze digital media assets. For example, the system 100 may include a data store or server 110 that stores and/or serves a plurality of media assets 114 over a network 120 such as the Internet, a local area network (LAN), a wide area network (WAN), or the like to one or more media processing systems 130. For example, the media assets 114 may be temporal media such as video and/or audio files or may be still images. In other embodiments, though, the data store 110 may be linked more directly via wired or wireless connections to the media processing system 130 and may in other cases be a part of the memory/data storage of system 130.

The media processing system 130 may be a workstation or other computing device that an media analyst or media asset user may operate to process media assets by running a set of CI tools or algorithms and/or applications on the media assets. The system 130 may include a microprocessor or CPU 132 that runs or manages input and output (I/O) devices 134, such as a keyboard, a mouse, a touch pad/screen, a printer, and the like to allow the media asset analyst/user to enter input or data and to receive output such as via a graphical user interface (GUI) displayed on a screen of a monitor 136. For example, the system user may operate the I/O 134 to initiate the CI framework environment by causing the system 130 via CPU 132 to run a CI framework 160 and may then enter input or data to select one or more of the media assets 114 to process with the CI framework 160 to create data cache files 172 and feature algorithm tags 180 that are stored in memory 170.

The system 130 may also be used to run a media access or feed application 140 that may be used to create the GUI 138 to allow a user of system 130 to select assets 114 for processing and to feed/play the selected media 114 for analysis by the RA modules 164 (and/or later for accessing by the FA modules 168). Further, the system 130 may include one or more media processor applications 150 such as Adobe's PhotoShop that may be used by an operator of the system when run by microprocessor 132 to utilize and/or build upon the outputs of the feature algorithms 168 (i.e., tags 180) and/or data generated by the RA modules 164 (e.g., data tracks 176 or other metadata provided in memory/data cache 170 in the data cache files 172 provided for each asset 114).

As shown, the microprocessor 132 runs or manages operation of executable code in the form of a CI framework 160. The CI framework 1 0 includes one or more CI plugins 162 that each include executable code in the form of one or more raw analyzer (RA) modules 164 and one or more feature algorithm (FA) modules 168. When used to process a media asset, the RA modules 164 extract or generate information or properties regarding each media asset 114 (such as a video file that is played in its entirety for at least partially concurrent analysis by all the RAs 164). The CI framework 160 is adapted to store in memory 170 a data cache file 172 for each of the assets 114 that is processed by the CI framework 160. Each data cache file 172 is associated with a media asset file such as with a link or asset ID 174, and each data cache file 172 also includes one or more data tracks 176 generated by one or more of the RA modules 164. A UID 178 is used to link the data track 176 with the generating or producing RA module 164 (which would also use this UID). Each data track may include a list of time stamped samples of binary data of a particular type (such as histogram data for a video frame(s) or the like). The FA modules 168 may act to process or use some or all the data tracks 176 so as to generate tags 180 that are linked by a UID 184 with the producing or generating FA module 168.

In the system 130, there may be two application programming interfaces (APIs) for client to utilize (not shown in FIG. 1) such as components of the CI framework 160. First, a management API may be used to control primary ingestion of the media assets and related tasks. Second, a feature API may be used to allow/control access to the, various features that the CI framework 160 provides. The feature API may route through the access to the feature algorithm modules 168 from the analyzers 164 or other plugins 162. The management API may provide a relatively classical set of functions that can be extended over time while in the case of the feature API it may be unknown upfront which structure (or signature) the individual feature algorithms 168 may have. To accommodate this arrangement, the CI framework 160 may use a client API that works more in the way of requests; followed by responses rather than a large number of API calls that would have to be extended more often to catch up with developments. The transmitted data in the framework 160 (e.g., parameters and results) may have the form of eXtensible Markup Language (XML) data, although some embodiments may use a binary equivalent (e.g., class PropertyList which is a dynamical tree of simple types like numerical values and strings, or the like) of XML for increased performance.

Figure 2:
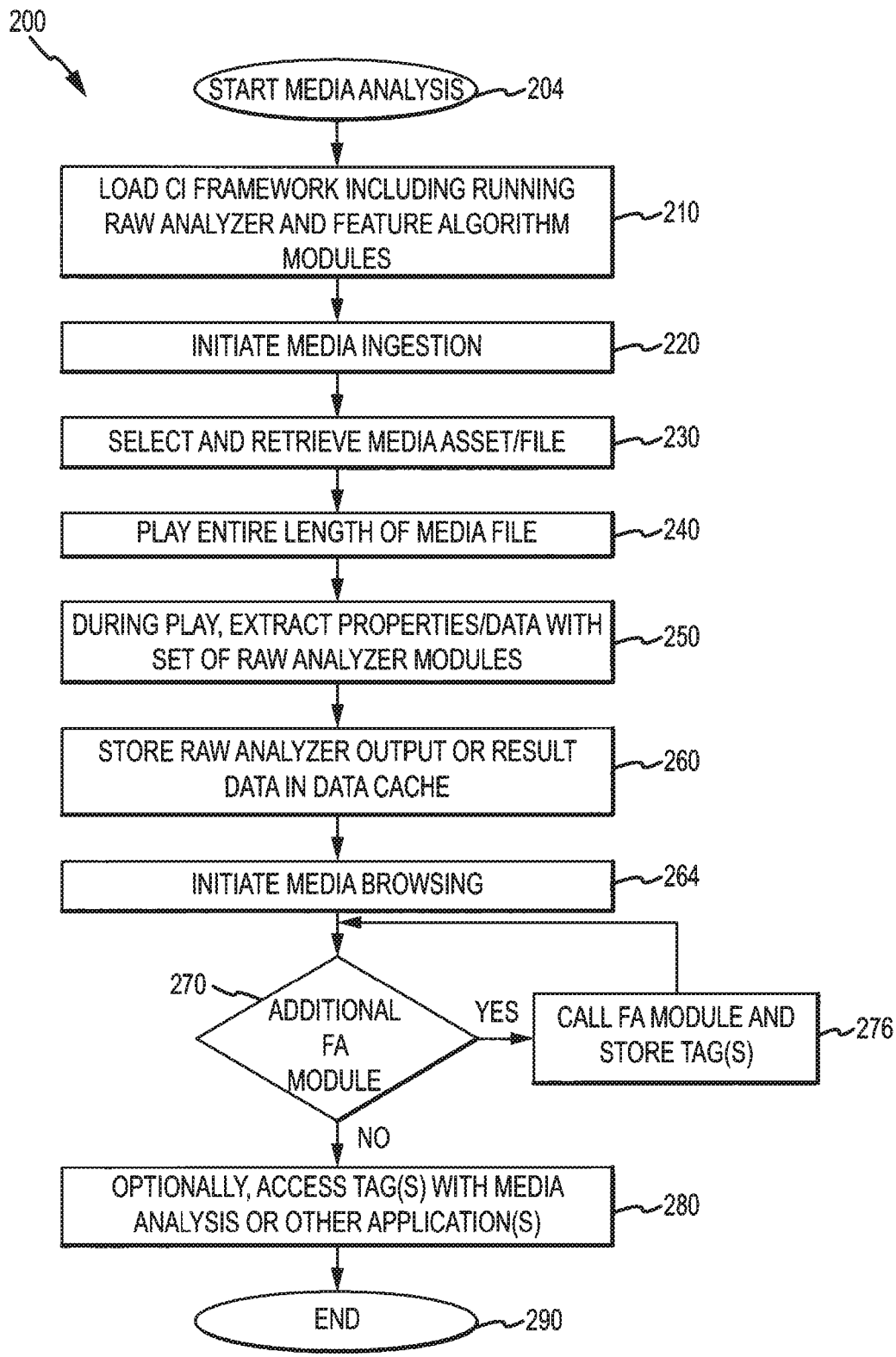
FIG. 2 illustrates a flow diagram of a method of running a set of RA and FA modules to process media data or a media asset (e.g., a temporal media asset such as a video file)

In a temporal architecture (i.e., one used more for analyzing video and audio files), the CI framework 160 may basically work in two steps: ingestion and browsing. FIG. 2 illustrates operation of the system 100 to provide media analysis 200 such as to analyze temporal media assets 114. As shown, the analysis 200 starts at 204 such as with providing or loading the CI framework 160 onto a media processing system 130 and providing the CI framework 160 with access to the data store 110 and media assets 114 (such as via network 120 or these assets may be local on system 130). At 210, the analysis 200 is shown to include loading the CI framework 160 and a user may provide input via GUI 138 or 1/0 134 to select CI plugins 162 for use in analyzing media data and/or by specifically configuring a CI framework 160 with particular RA modules 164 and FA modules 168. Other embodiments may allow all available RA modules 164 and FA modules 168 to be run at 210 to create data cache files 172 and tags 180 for later selective use by media processor applications 150.

At 220, the analysis 200 includes initiating media ingestion, and at 230 a media asset/file 114 is selected and retrieved from store 110. At 240, the entire length of the media file 114 is played. In other words, during ingestion a media file 114 is played in its entire length past all the raw analyzer modules 164 of all plugins 162 or active/selected ones of the plugins 162 in the CI framework 160. The CI framework 160 may be triggered by an exporter plugin 140, such as Adobe's Premiere Pro or similar products, that may act to hand single video frames to the CI framework 160.

At 250, each RA module 164 extracts properties or data from the media asset and at 260, this data is used to create a data cache file 172 for each asset (identified with ID or link 174) to include a data track 176 associated via UID 178 with a particular RA module 164. During these steps, each RA module 164 may extract immutable properties from the media 114, which may be provided/played by application 140, such as histogram data and stores it in the data cache 170. Such concurrent versus sequential analysis by the RA modules 164 of the media asset 114 may be provided for performance reasons because some analyzers 164 may take significant amounts of time per frame of media data. Hence, if time-consuming RA modules 164 are used in a framework 160 it typically is better to run them only once in the background than during user interaction (browsing). This may also apply to decoding of the media 114.

An exemplary RA module 164 that may provide the functionality of steps 250 and 260 is a face-recognition algorithm run by microprocessor 132, and most face-recognition modules may fall into this time-consuming category because they are more CPU-intensive than a simple histogram generator (e.g., another exemplary RA module 164). However, even though a face-recognition-type RA module 164 provides high-level abstract data (e.g., face coordinates), from the CI framework 160 perspective, it produces immutable data since no parameters are applied to yield potentially varying results. The same functionality (e.g., face detection) may, however, be found again in one or more of the FA modules 168 as well, e.g., for a closer look or analysis of the same or similar data extracted from a media asset as the FA modules 168 build upon and use data 176 output from the RA modules 164.

The ingestion provided from steps 220 to 260 in method 200 of FIG. 2 principally happens once for every new asset 114. In some cases, more data may be added to an existing data cache file 172 from new raw analyzers 164 later (e.g., a later version of an RA module 164 may be added, a new RA module 164 may be added, and so on). Each RA module 164 may be independent and not, typically, require existence of other modules 164. In operation of system 100 and performance of method 200, an RA module 164 may receive audio or video frames in a certain format (or list thereof). The module 164 may also, in some cases, be able to request to receive more than just one frame of video or audio at a time, e.g., for frame-to-frame motion analysis or the like. However, these multiple sets of frames include consecutive frames and their number typically will be limited. In some embodiments, algorithms or CI tools that operate with random access to frames are provided as FA modules 168 rather than RA modules 164 such that they can access raw content data via a special interface. It might be routed through the data cache interface and presented as a virtual data track, while it is not stored in the data cache file itself.

As part of storing at step 260, the CI framework 160 may include a mechanism for storing data tracks 176 or RA module output only after it checks whether the existing parameters are equal or different from the newly generated parameters to determine whether the data cache file 172 contains valid or obsolete data. In some embodiments of the system 100, a RA module 164 may be constructed once per asset run (step 240) and then destroyed afterwards (in a step not shown in method 200 after step 250). For example, a method (e.g., a DoOneFrame method) may be called only once for every frame of an asset 114 and the frame timestamps are called in the order of the timestamps in the asset 114 (with no frame typically being omitted). The frame format may remain the same throughout the whole run in step 240.

Regarding the data case 170 of system 130, the data cache 170 stores the data, such as RA output 178, passed to it for later fast browsing and retrieval in one binary cache file 172 per asset 114. Inside one cache file 172, the data 176 may be organized by unique IDs (UIDs) 178 into multiple logical data tracks. There may be one UID 178 per RA module 164 and track 176, and the data may also be time stamped with the asset's media time stamps during ingestion 220. The time stamps for one UID 178 steadily increase from one data sample to the next (which may be the only condition for the time stamps). Data samples typically do not need to happen at any certain intervals nor do they typically need to be of the same size. One data sample may be thought to be the valid data from the time stamp on, which is attached to it, and the data sample lasts until the time stamp of the following data sample of the same track 176 (or the end of the file 114).

Generally, the data cache 170 does not know anything about the meaning of the data stored in one sample or about the internal structure of the data in files 172 or tags 180. The data cache may know UID, timestamp, and size in bytes of each data track sample 176 (or each file 172 or tag 180). Interpretation of the data in the cache 170 generally is left up to CI plugins 162 that generate and use the data. The timestamps of different tracks generally do not have a certain relationship to each other, but it may be useful to keep them relatively close so that when a portion of the cache file 172 is loaded into memory 170 all samples from different RA modules 164 for a certain period of time are present in the file 172. The data cache 170 is named such from the fact that it can be recreated at any time from the original media assets 114.

With further regard to the RA modules 164 and data stored in the data cache, it may be useful to discuss interpreting binary data within the media processing system 130. Since the CI framework 160 does not make assumptions about the meaning or structure of the binary data which the RA modules 164 and FA modules 168 provide, some embodiments leave it to the plugins 162 to handle the binary data directly while others place this responsibility upon users of the FA modules 168. In other cases, though, a general data format that is flexible enough to incorporate every structure that is deemed useful is utilized. For example, XML may be utilized by the CI framework 160 for data exchange for both the RA modules 164 and the FA modules 168, when data volumes are acceptably sized since it is a well-established format that many in the field know how to use and manipulate. In an XML-based exchange embodiment, a class PropertyList may be used to structure binary data into hierarchies that look similar to XML, while the data remains binary for higher performance. In such an embodiment, FA modules 168 may use parameters that are passed in from clients thus that dynamic adding of properties is permitted. Properties may be named such that users (e.g., client applications such as media processor applications 150) can recognize them readily, which may be achieved via use of variably sized strings. In other embodiments, a proprietary binary format may be used for RA and FA module communications.

Returning again to FIG. 2 and the method 200, when ingestion is done, browsing may be initiated at 264. This may involve the second part of a plugin 162 being called, i.e., a feature algorithm (FA) module 168 may be called. At 270, the method 200 looks to see if there are additional FA modules 168 to be called. If so, step 276 involves calling the FA module 276 to use the RA module(s) 164 data in data cache fields 172 to create a new feature result that may be stored in memory as a tag 180 linked to the FA module 168 by a UID 184. If there are no further FA modules at 270, the method 200 may proceed at 280 with accessing the FA module output 180 with one or more client applications such as media processor applications 150. At 290, the method 200 is ended.

With further regard to the FA module 168, this algorithm may access the cache file 172 via a data API (not shown in FIG. 1) and retrieve the temporal data useful for its particular operation from data tracks 176. The FA module 168 knows the meaning of the data for the UIDs 178 it uses, and it can also, in some cases, use UIDs 178 that were not generated by the RA modules 164 within the same plugin 162 but, instead, from any other CI plugin 162 in the framework 160. For example, histogram data of a certain type is only generated once by a particular RA module 164 for use by any FA module 168 rather than multiple times for each plugin 162 that may utilize such data for a media asset 114. The output of an FA module 168 may take a number of forms to practice the system 100 and method 200. For example, each FA module 168 may produce lists of tags 180 (linked to the FA module 168 by FA UID 184), which may attribute a certain value or statement to a segment of the original media asset 114, e.g., "Scene Number 1 ranges from 0.0 seconds to 3.12 seconds" for a scene determination algorithm. Tags 180 of this form may be stored in the data cache 170 as shown in FIG. 1 and be used by other FA modules 168 (e.g., the modules 168 may build on other FA modules 168 and/or on RA module outputs in data cache files 172). The FA modules 168 may also provide output that is stored differently such as XML and/or in XMP and be used by FA modules 168 and/or by applications 150 from this alternative/additional store in system 130. Either data store technique provides much smaller volumes of data (or media asset metadata) when compared with accessing the media asset itself.

The tags 180 may be immutable, e.g., shot or scene tags, and also highly volatile, e.g., the result of a visual search for objects in a video. In the first case (or immutable), there may be no parameter that is passed to the FA module 168 that may alter the result. However, in the second or volatile case, a search or similar feature may pass parameters and a reference image of an object to the FA module 168 to generate a ranked list of similar objects. In such cases, the result or output of the FA module 168 may be consumed directly by an application 150 without it being stored as tag 180. In practice of system 100, different FA modules 168 may need very different parameters ranging from none, over lists of name value pairs, to binary image data and the results/output may also vary a large amount within a particular CI framework 160. Hence, in some cases, the parameter input and result output data of the FA modules 168 may be described similarly to the other data stored in the data cache 170 such as with a UID 184 along with a size for the binary blob of data (with, typically, a caller and a callee knowing the meaning of this data). Some embodiments may provide for more humanly readable formats such as XML/XMP while at the core FA modules 168 utilize and provide a binary data transfer in and out.

Another example of a CI plugin may be a scene-detection plugin 162 that utilizes an RA module 164 to provide histograms 176 in a data cache file 172 and uses an FA module 168 to generate (as shown at 180) a vector of shot boundary timestamps. During the ingestion phase, the histogram samples are generated by the RA module 164 from the video frames of an asset 114 played/provided by media access application 140, and these samples are stored for each frame as shown in at 176 with the RA's UID 178 in a data cache file 172 for the identified asset 174. Then, the feature algorithm 168 generates the vector of timestamps during one call based on the stored histogram data (or RA output data) 176.

Regarding access to the original assets 114, some FA modules 168 may use random access to the original footage or media data of an asset 114. For instance, a CPU-intensive algorithm plugin 162 may have been run as raw analyzer 164/feature algorithm 168 combination earlier for every fifth frame in an original video. However, for a certain workflow, it may be useful to run it again for every frame in the vicinity of a particular timestamp. In use of CI framework 160, a certain UID may be used to give access to this data via an interface that provides the data to the RA modules 164.

A plugin 162 may be implemented in system 130 as an executable piece of code (that may be dynamically linked) that brings a number of raw analyzers 164 and feature algorithms 168. Plugins 162 may be classes that implement a set of predefined methods, and the source code may be provided as part of the CI framework module 160 run by microprocessor 132. Where binaries are desirable that may not be part of the CI framework 160, these may be wrapped by classes defined by the set of predefined methods (which may be part of a plugin themselves such as an implementation of the abstract interface "ICITPlugin" or the like). Plugins 162 are useful (but not required) to bring a situation where it is reasonably easy to add new functionalities to a CI framework 160.

From the above discussion of FIGS. 1 and 2, it can be seen that the CI framework or toolkit concept provides an extensible framework for running content analysis on media assets. The CI framework provides output via the RA and FA modules to enhance understanding of an asset's content (e.g., discovery of visual or other properties in a video, a still image, and/or a sound recording such as by running algorithms that act to detect faces, find logos, track objects, and the like). The CI framework or toolkit acts to facilitate collection of RA and FA modules providing content intelligence and then add and combine intelligence on top of the RAs with FAs and on top of FAs with other FAs and applications for ready integration by clients and client applications (e.g., the CI framework may be thought of as a bridge between CI providers and client applications).

Figure 3:
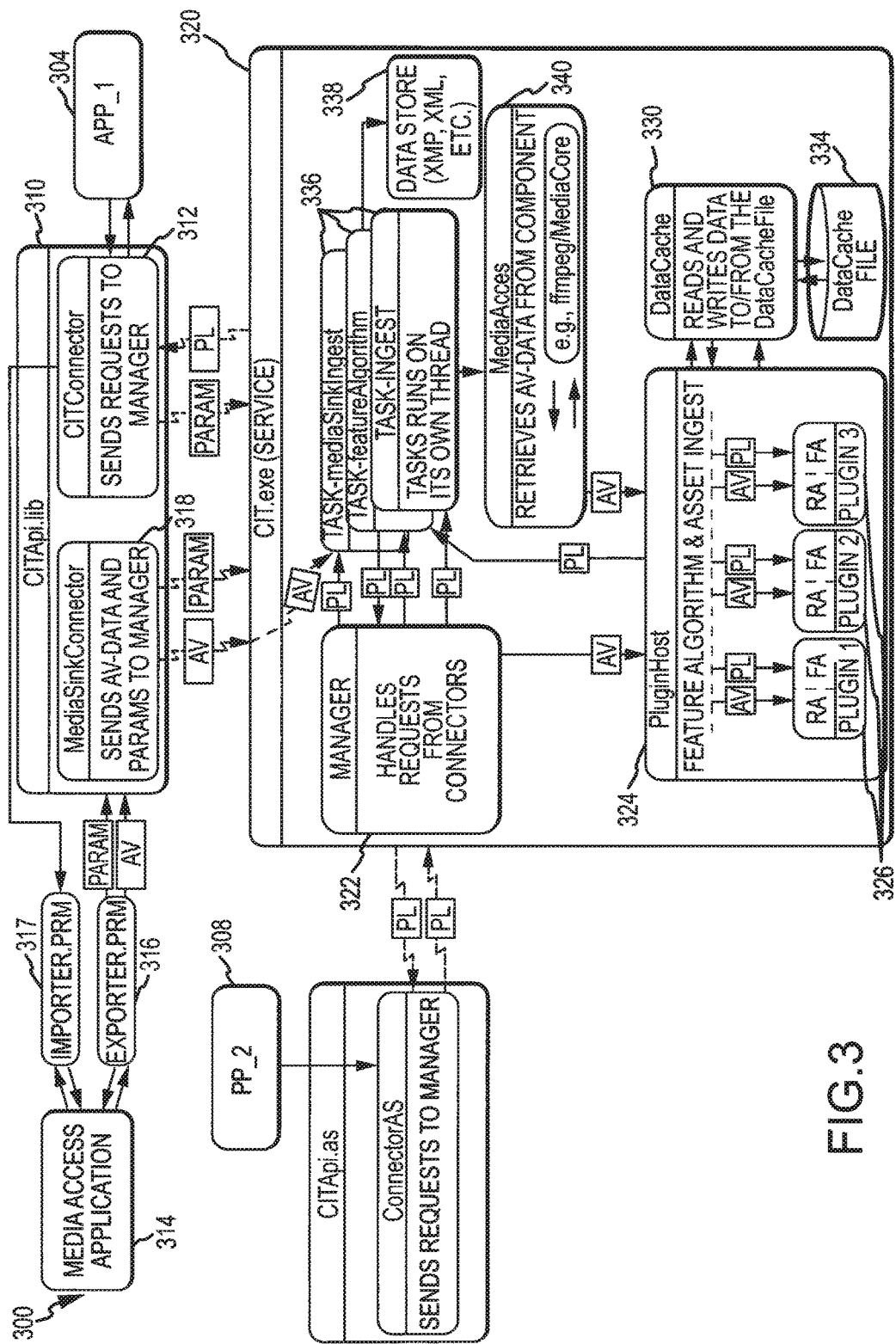
FIG. 3 illustrates a CI environment in functional block form that may be implemented as software modules within one or more computer and/or memory devices.

FIG. 3 illustrates another implementation of a CI framework 300 that may be implemented via software modules or components run by one or more microprocessors of one or more computer devices (similar to that shown in FIG. 1). Note, in FIG. 3, the boxes labeled "AV" refer to audio/video data, the boxes listed as "PL" refer to property lists (or the PropertyList class), dashed arrows are used to represent socket or shared memory connections, "param" refers to parameters, "RA" is used to refer to the raw analyzer phase, and "FA" is used to refer to the feature algorithm phase of the CI framework 300.

The CI framework or toolkit 300 is described below by discussion of its main components. The CI framework 300 includes a library module 310 (e.g., CIPApi.lib in FIG. 3), and client applications using the framework 300 may integrate the library module 310, which is adapted in some embodiments as a thin stub library that offers API calls in order to communicate with the CIT service 320 (e.g., to trigger content analysis, retrieve results, and the like). In using a CITConnector API 312, clients like application 304 may hand a file path to the CI framework 300. Other clients, like the media access application 314 (which may be implemented as Adobe's Premiere Pro or similar products), that want to feed the CI framework 300 directly with AV data may use other connector APIs 318 (e.g., MediaSink.Connector API or the like).

The media access application 314 provides an exporter plugin 316 and an importer plugin 317. The application 314 may function to set up the exporter plugin 316 in order to communicate with the CI toolkit service 320. The plugin 316 may retrieve single video frames and hand them over to the CI toolkit service 320 such as by leveraging the library module 310. The importer plugin 317 may request results from the CI toolkit service 320 later and drive further processing (e.g., XMP export, visualization, and the like).

The CI toolkit service 320 provides the main CI framework 300 functionality and may run in a local service as shown in FIG. 3. This service 320 hosts the CI framework or toolkit's core logic like a manager 322 for managing tasks, components for optional encoding and decoding of media, a CI plugin framework 324 with CI plugins 326 that each include one or more RA modules and one or more FA modules, a data cache 330 for storing data cache files 334 for each asset, and components 336 exporting the analysis result data 338 as XMP, XML, or the like. The CIT task manager 322 may function to manage requests to the CI framework service 320, with the requests being run as separate threads in some embodiments. The task manager 322 may be responsible for setting up and managing concurrent tasks. CIT clients (such as applications 304, 308) may get a handle to those tasks in order to poll for progress and completion.

A media access module 340 may be provided in the CI framework service 320. For clients 304, 308 that are not going to encode or decode the material to be analyzed on their own, the CI framework service 320 may provide a media access component 340 to support communications with the service 320 and accessing of output data from plugins 326. The media access component 340 may leverage, for example, from existing frameworks such as Adobe's MediaCore, ffmpeg, or the like.

The plugin host or framework 324 includes RA/FA plugins 326 that implement one interface but are run in two phases: a raw analyzer phase (RA) and a feature algorithm phase (FA). During the RA phase, the plugin host 324 fires raw data to the plugin 326 (e.g., RGB data of a video frame), and the RA phase/module of the plugin 326 acts to compute intermediate results (e.g., histogram data). This result data is handed back to the plugin host 324 that, in turn, acts to save the data to an associated data cache 330 in an asset-specific data cache file 334. In some cases, these results 334 are considered immutable as they depend on parameters that change very rarely.

Later on, the FA module or phase of the plugin 326 may be triggered, and the FA module may retrieve the RA result data from the data cache file 334 of the data cache 330. The FA module of the plugin 326 then acts to run one or more algorithms on the data (e.g., to perform scene detection in a video media asset). The result data from the FA phase/module may be handed back to the plugin host 324 in order to write it to XMP 338, to hand it to a client application 304, 308, and/or to store it within the data cache 330. The FA module/phase results may be relatively volatile as they can depend upon direct user input/parameters. Note, plugins 326 do not have to have both an RA and an FA module/phase and FA modules may use other plugin produced data (from an RA and/or an FA module) from the data cache 330 and/or data cache file 334. One reason for splitting up the plugins 326 into two phases (an RA and FA phase) is for improved efficiency. The RA phase/modules may be thought of as doing the pre-work that then can be used or built upon to make the FA phase/modules run much faster when the RA output data (in data cache file 334) is requested.

In the framework 300, the data cache 330 may be used to persistently store RA and/or FA result data. The data cache 330 may be adapted to provide an interface for quickly accessing the data produced for/from a particular media asset. The RA modules and FA modules of the plugins 326 may exchange data structures with the plugin host 324 that are not necessarily known in advance. A node tree (e.g., a PropertyList (PL)) may be provided for this purpose to allow handling of a tree structure of simple built-in types. In some embodiments of the framework 300, a query API or similar module (not shown in FIG. 3) may be provided to retrieve results of an analysis performed by the plugins 326. Such a query API may ask for high level data (e.g., number of faces in a video frame) or low level data to run further analysis (e.g., histogram information of certain video frames). The query API may also yield combined results from more than one plugin 326 or media asset at a time (e.g., object search over multiple assets). In some cases, results are retrieved by calling a particular FA module of a plugin 326 via its API or the like.

As discussed above, each of the plugins 326 may be an executable piece or module of code that brings any number of RAs and FAs together. In some cases, a plugin 326 may provide code for one RA and one FA. Using an extensible plugin architecture allows differing developers and development teams for content intelligence to provide new functionality to the CI framework 300 without necessarily knowing about all the internal code of the framework 300 and all aspects of media management (e.g., encoding/decoding). The developers/teams may simply use the CI host 324 plugin API and can focus on the specific analysis or functionality they are interested in providing or achieving in the CI system/application.

The RA part or phase of each plugin 326 may function to extract semi-immutable properties like histogram data from image or audio frames (e.g., from media data or media assets). The CI framework plugin host 324 may fire raw data to the RA module, and the RA computes/creates some analysis results. Output data is handed back to the plugin host 324 to store into the data cache 330 in files 334. This phase of the plugin 326 operation is called ingestion of a media asset. Both the RA and its output data may be referred to by a single (the same) UID to link these together. The RA may receive audio and image frames in a defined format (e.g., BGRA32 or the like) from the plugin host 324. It may also request to receive more than just one frame at a time (e.g., a sliding window). In some cases, the ingestion step may happen once for every media asset being processed even though more data may be added to an existing data cache file 334 by additional RAs at a later point in time or later operating step of CI framework 300.

Figure 4:
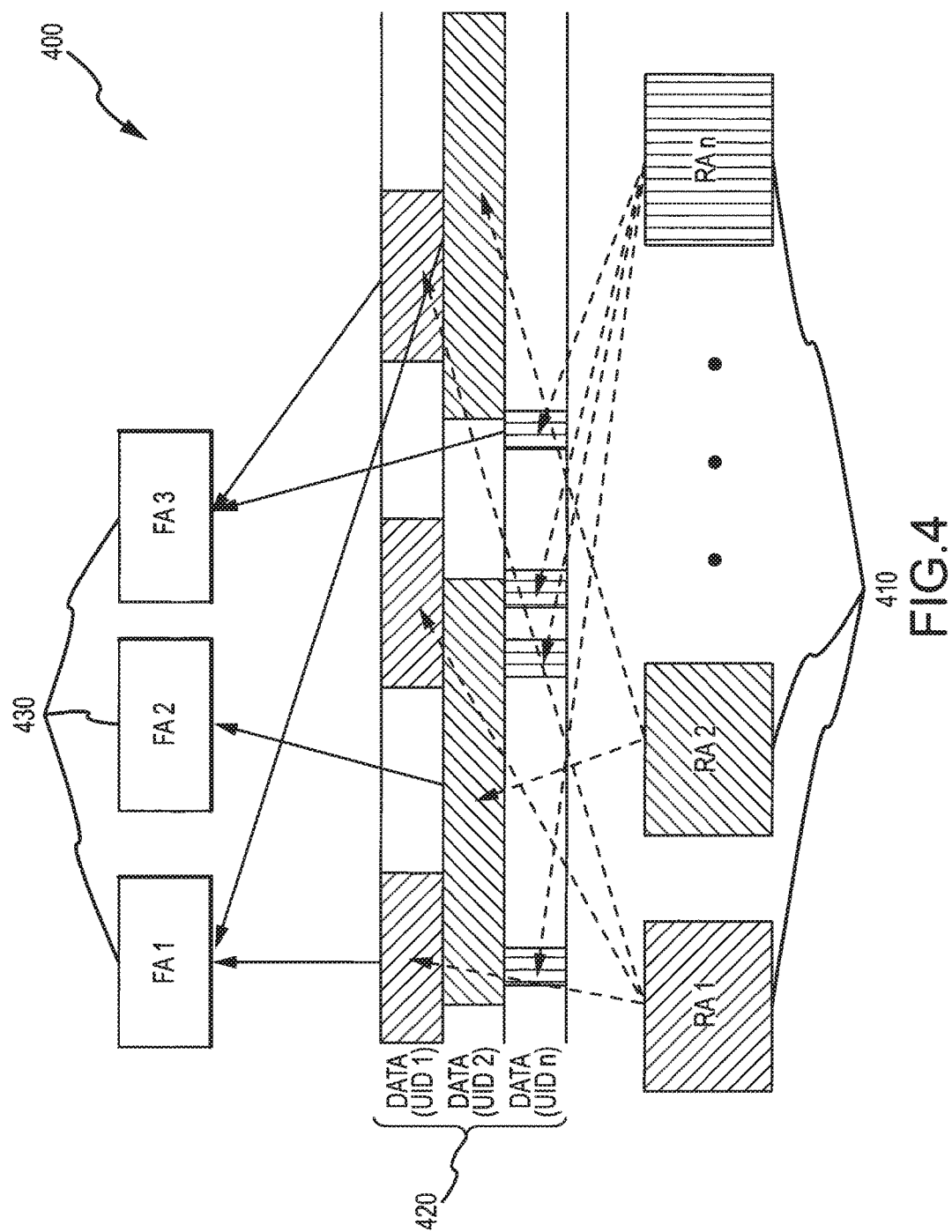
FIG. 4 is a graph or schematic illustration of data dependencies between feature algorithm modules and generating raw analyzer modules.

The FA modules or portions of the plugins 326 may act to retrieve the RA(s) result data from the data cache 330 and turn it into its own output. For example, each FA module may turn the RA data into lists of tags (e.g., specific content-related metadata like "Scene Number 1 ranges from 0.0 seconds to 3.12 seconds" or the like). This phase of plugin operations may be called browsing. The FA module and the type of tag may also be referred to by one (the same) UID. The result tags or FA results of an FA module may be used by other FA modules. The tags or results may be stored as XMP, in XLM, or the like and be used from this type of storage by client applications. Tags may be immutable (shot/scene tags or the like) or be volatile (the result of visual search for objects in a video, for example). A search might pass parameters and a reference image of an object to the FA module to generate a ranked list of similar objects. In such a case, the result might be consumed by the application directly with or without storing it in memory. The FA module knows the meaning of the RA output data that it uses, and the FA can be dependent on several RA modules and their outputs (which may be part of the same or a different plugin 326). This type of data dependency 400 is shown in FIG. 4. As shown, RA modules 410 generate data tracks 420 that are linked to the generating/producing RA module 410 by a .UID. The set of FA modules 430 may utilize data from one or more of the RA modules 410, and these RA modules 410 may be from the same or differing ones of the plugins (e.g., FA3 uses data from RA1 and also RA n while FA1 is dependent on data from RA1 and also from RA2).

One example for a plugin 326 of FIG. 3 is a scene detection plugin that acts to determine data useful for splitting a video into its different scenes. In this case, the RA module may consume each video frame and compute histogram data for the frame. Later on, the related FA module of the plugin (or another plugin) may determine scenes dependent on certain changes to the histograms from frame to frame (e.g., the FA module results are dependent on the RA results/histograms stored in a data track in the data cache file 334 in the data cache, which is accessed by the FA module). Again, a reason for splitting up the plugins 326 into RAs and FAs is efficiency. The RAs do the pre-work, which then makes the FAs run much faster when they access the data they use to produce a particular output or feature (which may, in turn, be used as input to a client application 304, 308). The split may be largely logical, with only few consequences in the code structure. The code for the RAs and the FAs may live or reside in the same plugin class (or binary, once applicable) and may share common functionality.

Figure 5:
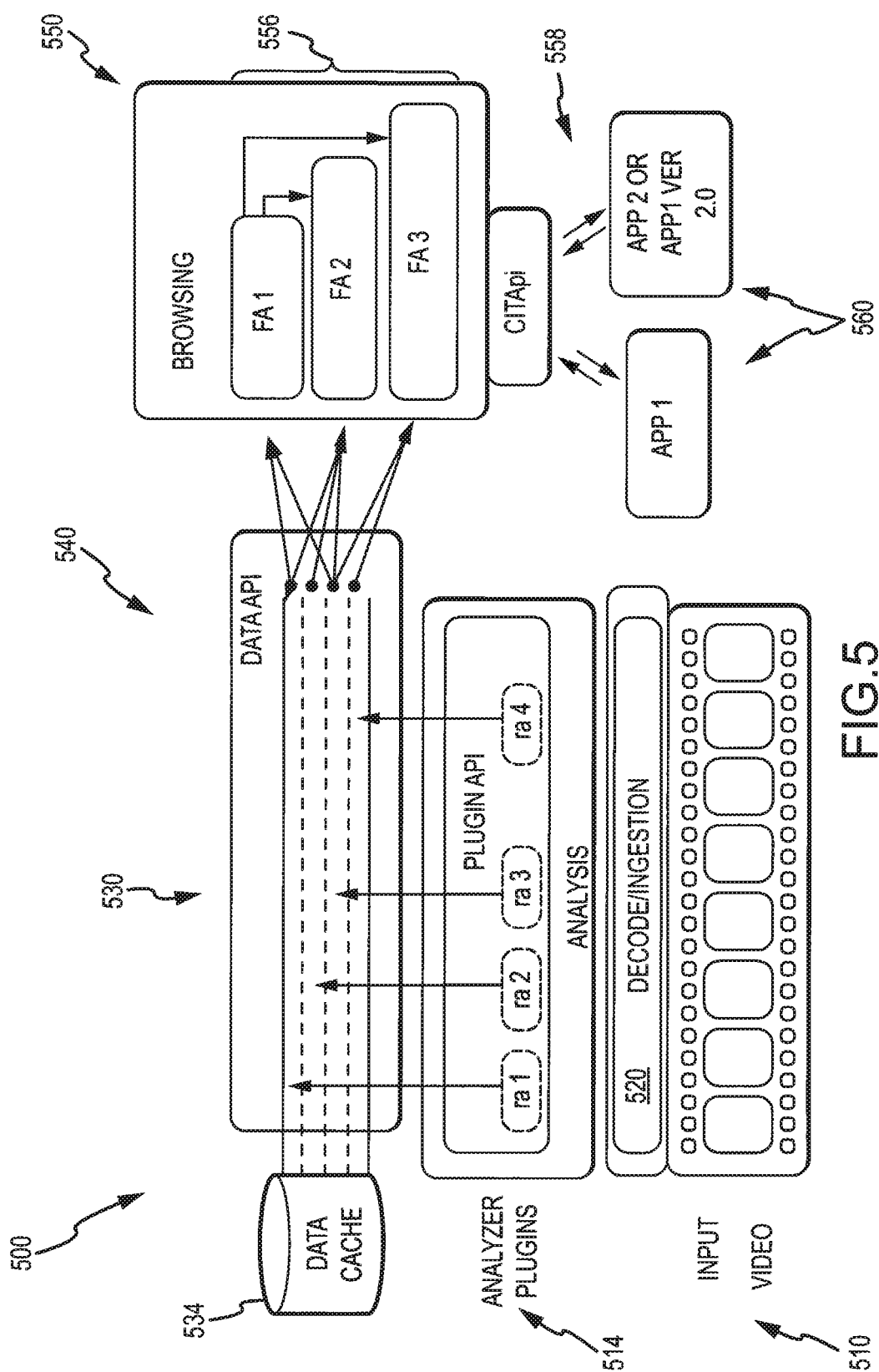
FIG. 5 is a schematic illustration or functional block drawing of operation of a content intelligence framework to analyze a media asset.

During plugin discovery, a plugin API for the host 324 or other portion of service 320 may be used to retrieve the UIDs for the RA modules. In another step, the CI plugin host 324 of service 320 may act to sort out the dependencies (e.g., while the RA modules are independent from each other, the FA modules may depend upon the output data of other plugins 326 and their RA modules and/or FA modules). FIG. 5 illustrates a graph 500 illustrating use of a CI framework such as framework 300 to analyze media assets and showing how a new feature can depend upon new and existing features and raw data alike. As shown, a media asset 510 in the form of an input video file may be played for a set of analyzer plugins 514 with a set of raw analyzers RA1 to RA4, which act during decode/ingestion 520 to analyze the asset.

During ingestion, the RAs of plugins 514 act to create output or data tracks 530 that are associated to the RAs by UIDs and that are stored in a data cache file in data cache 534. In the data cache 534, the data 530 may be organized by UIDs into multiple logical data tracks. There may be one UID per raw analyzer and track. The data may be timestamped corresponding to the asset media timestamps received during ingestion 520, with the timestamps for one UID increasing from one data sample to the next. Data samples do not need to occur at certain intervals, and they typically do not need to be the same size. A data sample may be considered valid until the next data sample (or end of the asset 510).

During browsing 550, a data API 540 may be used to allow a number of FA modules provided by plugins 514 to access the data tracks (or output of RAs) 530, and again, the dependency is not necessarily a one-to-one dependency or limited just to an RA in the same plugin 514. Further, an FA 556 may also be dependent on output of another FA 556 (e.g., FIG. 5 shows that FA2 and FA3 are dependent upon or use the output results of FA1). The CI framework API 558 provides data access to client applications 560 such that these client applications 558 may utilize the FA outputs (e.g., tags or lists of tags).

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed. For example, a CI framework may also be run in a server environment rather than the client/user computer as shown in FIG. 1.

Additionally, it may be useful at this point to provide further overview of the CI toolkit of framework (such as may be implemented as shown with CI framework 160 in FIG. 1). The CI framework may be adapted to work on a desktop device such as with conventional operating systems (e.g., Windows or Mac operating systems) and/or adapted for use on a server (e.g., a Linux-based server). This may mean that the CI framework depends on different components, e.g., for media access, on the different platforms. For this reason, the CI framework may use components such as Adobe's MediaCore or the like in some implementations rather than being implemented as a part of such components. The CI framework may be accessed from different applications on a desktop or server, and there may be heavy parallel background tasks being performed (e.g., the initial indexing/ingestion of the media assets), which may be run on assets that are too large to be copied efficiently so that they are shared by different processes. In some cases, a central instance per machine is provided of a CI framework that manages requests from different processes (in some cases, even if the individual tasks performed are rather simple but CPU intensive).

Because of these issues, the CI framework may be a process that runs like a local service and spawns child threads and processes as appropriate. The CI framework process may, however, be headless (e.g., there can be a controlling GUI for convenience but not required). The CI framework process may receive commands via socket communication from either local or distributed clients. For clients (e.g., point applications), this communication may be hidden behind client libraries, which the clients can link to and use as if they were simple in-process libraries. For example, a C++ library (e.g., one that implements a class Connector or the like) may be used that clients may use to access a local CI framework and/or a remote CI framework. The local CI framework may also be accessed in-process, with or without multithreading (e.g., for debugging purposes). Out-of-process access may work via sockets so as to allow access to a local or remote CI framework.

Regarding a still image architecture for the CI frameworks, the above description stresses use of the CI framework for processing temporal media data such as video or audio files. However, the concepts and functions described may also be used for processing media assets or media data for still images. Still images lack the tight temporal relationship of video frames in a video. Consequently, algorithms that make use of this relationship may not be used in a CI framework processing still image assets. However, the split of algorithms into raw analyzers and features is useful for still image processing since, again, a first ingestion step may be used to generate raw metadata that can then be used by the feature algorithms, e.g., to later search within an image for an object or face. A data cache may again be utilized, but it may be modified such that many assets (and/or their raw metadata) are stored in one cache file such that many images may be searched or otherwise processed by a feature algorithm (rather than each asset having a data cache file). File paths may be utilized in place of timestamps for addressing images, but timestamps or other information may be used to provide an index value in an array for referencing an image file in the data cache.

It may be useful to provide another specific working example of a content stream being analyzed by two or more RAs and then the output being used by an FA or two (e.g., with one FA using the results of another FA or the like). For a feature "scene similarity" for example. RA1 may compute histogram data per frame and store these results in the data cache in a data track while RA2 may compute color swatches and stores them as well in the data cache file for the same media asset. FA1 may then calculate the scene-cuts in the video (or other asset) from the data cache file values stored by RA1 and/or RA2 and afterwards FA2 may calculate an average color swatch per scene depending on the output of FA1. Then, further, FA3 may take pairs of average color swatches from FA2 and compares them, which may result in an N by N matrix of similarity values for the N scenes.

It may also be useful at this point to provide an example of the form an asset file may take in a data cache, e.g., explaining how the data differs from the original file. Building on the relatively simple examples above, the per-frame histogram data may be a three-dimensional array with 16 possible values for each dimension (e.g., the three color components red, green, and blue) resulting in a total of 4096 buckets. Each entry in the array is an integer value of how many pixels in one frame have a color-tupel which falls into this "bucket". If each integer value is 4 bytes large, that results in 16384 bytes per frame. A DV-encoded video frame has around 145000 bytes of data, for comparison, and the histogram data is not required for every frame, but every fourth, in the current implementation. Since many of the buckets are usually empty, a simple RLE data compression would achieve further reduction. The color swatches are a lot smaller still as they are a list of five RGB-color triples. Each RGB color is made up of three 8-byte double values, which results in a total of 120 bytes per frame.

Regarding improvements in efficiency provided by a CI framework implementation, it may be said that the performance improvements can be huge in one case while being relatively small but still significant in another, depending on the algorithm. For example, for N raw-analyzers that each access the raw pixels of a video, the speedup is around a factor N. This is because the decoding of the video only needs to happen once for all RAs, and there are many algorithms that are computationally cheap, so that the frame serving is indeed the bottleneck. But, for instance for the scene-detection, the gain is huge (e.g., greater than 1000 times or the like) when a user plays with the threshold and wants to see what different results he gets for each value. In that use-case, the result available is mostly instantaneous, whereas without the data cache the video would be decoded multiple times.

Typically, the CI framework or toolkit interface to the outside world is rather small. For example, a call to Connector:Open( ) loads the CIT.dll and enumerates the available plug-ins/algorithms. Ingest(analyzerUidList, videoFile) may be used to run all specified analyzers on a video file ("videoFile"). One or multiple calls to CallFeatureAlgorithm(FA-UID, parameters, output, datacacheFile) may be used to run the feature algorithms. As a fmal/next step, the user may walk the resulting propertyList "output" to retrieve the individual results, which is very similar to XML-parsing (in fact the propertyList can be converted into XML, but that is not the most attractive proposition for a developer using the CIT interfaces in C++).

The CI framework or toolkit approach is believed to be very useful in the realm of content-intelligence. Typical artificial intelligence/content intelligence (AI/CI) related tasks are very context sensitive, which for instance means that one parameter "threshold", which works well for one situation is useless in another. Making an algorithm robust may cause a developer to either adjust the parameter to each situation or leave the parameter alone and interpret the results accordingly. However, the second algorithm which does that might not be related at all to the original algorithm. For instance, the face detector may tend to produce false positives, i.e. it sees faces where there are none. To address this problem, the faces in one scene may be grouped (e.g., reusing scene detection along the way) and tracking how each face moves through a scene along a path. The false positive suppression is not the main output of the algorithm, but it is one of the reasons why it is deployed. Of course, this functionality may be all put into one algorithm, but that would suppress collaboration in the team and probably result in the usual convoluted mess in the code, which may make it difficult to take the code apart later on and improve it. In contrast, the CI framework described herein provides plugability of relatively simple algorithms, which significantly enhances the ability to develop more abstract ones or feature algorithms and the like.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the CI framework 160 such as the RA modules 164, the FA modules 168, and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The term "form generating system" encompasses all apparatus, devices, and machines for processing data, including by way of example a programmable processor, a computer, or multiple processors or computers. The system (such as systems 100 and 130 of FIG. 1) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form; including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 1 is a block diagram illustrating one embodiment of a computer system 100 and media processing system 130 configured to implement the methods described herein. In different embodiments, computer systems 110 and 130 may be any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data. e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user (with an I10 portion 134 of system 130 or monitor 136 of system 130 or the like), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

At this point, it may be useful to provide another implementation or use example for the CI framework or CI toolkit (CIT) that highlights exemplary virtues or advantages of the CIT. The CIT may be useful to in performing video summarization such as in a system that renders representative short summaries of a video, like animated chapter thumbnails (e.g., for DVD authoring or other tasks). In this implementation, a first step may involve segmenting the given input video into smaller chunks using a shot detection algorithm, with an RA to calculate histograms for individual frames and an FA to determine shot boundaries based on the histogram values, for example. The video summaries may now be generated using the CIT based on a certain set of criteria. For example, the criteria may include no black frames, no frames with titles/credits (using OCR, color analysis, and/or the like), shots with high activity (using an Activity Estimator), shots with one or more people (using Face Detection), do not split dialogues when selecting content for the summaries (using Speech-to-Text and Audio Silence Detection), and so on.

All the algorithms defining the criteria may be implemented as CIT RA/FA plug-in combinations. The CIT allows one to structure the code into plug-ins, and a new and an older version of the algorithm may be available simultaneously without any copying of code or binaries, because the new algorithm will differ only in those parts which are actually new (e.g., a new top level plug-in when thinking in the functionality-tree which is built up by plug-ins using each other's output). As a result, updates to existing algorithms may be achieved, for example, by simply updating the corresponding CIT plug-in. Additionally, new criteria (e.g. a Sound Classifier) can be added by simply adding a new CIT plug-in. So, not only can the new functionality be safely built from the old code, but it can also be safely developed and tested because the old algorithm will always be available in the very same source code for immediate comparison. This example illustrates the power of the CIT. In contrast, prior CI systems typically focus on tailored solutions for specific use cases (e.g., face recognition), but they did not care about making it easy combining results of different types of content intelligence. CIT closes this gap in providing a system for content intelligence lego, which means to combine a set of isolated algorithms to retrieve complex information about content.

The invention claimed is:
1. A computer-implemented method, comprising:
using a media processing device, accessing, from a data store, a plurality of portions of a digital media asset, wherein the plurality of portions are analyzed based on executing a media asset analysis plugin having a plurality of raw analyzer modules and a feature algorithm module, wherein the plurality of raw analyzer modules and the feature algorithm module are operable as a plug-in combination that supports shared common functionality in the plurality of raw analyzer modules and the feature algorithm module, wherein the plug-in combination comprises code for operating both the plurality of raw analyzer modules and the feature algorithm module in combination for content intelligence processes;
using a microprocessor of the media processing device, the microprocessor operating based on the plug-in combination, executing the plurality of raw analyzer modules to analyze the portions of the digital media asset to produce sets of raw analyzer results data, wherein the sets of raw analyzer results data are accessible by the feature algorithm module based in part on the code of the plug-in combination;
storing in a data cache the sets of raw analyzer result data in a media asset cache file associated with the digital media asset, wherein each of the sets of raw analyzer result data is linked to a particular one of the raw analyzer modules based on data tracks in the media asset cache file;
based on a call to the feature algorithm module, accessing the data cache storing the set of raw analyzer result data in the media asset cache file; and
upon accessing the data cache, executing, using the code of the plug-in combination, the feature algorithm module to generate an analysis result for the digital media asset, based on, at least one of the sets of raw analyzer result data in the data cache, wherein the at least one of the sets of raw analyzer result data is specific to the linked raw analyzer module that generated the raw analyzer result data.

2. The method of claim 1, wherein the digital media asset comprises an audio or video file and the portions comprise temporally-related frames of the audio or video file that include timestamps.

3. The method of claim 2, wherein each of the sets of the raw analyzer result data comprises the data track providing metadata for the frames extracted by an associated one of the raw analyzer modules and associated with the frames of the digital media asset via the timestamps.

4. The method of claim 3, wherein the metadata comprises an immutable property of content in the audio or video file.

5. The method of claim 1, wherein during a raw analyzer phase, the plurality of raw analyzer modules of the plug-in combination operate to compute intermediate results data and during a feature algorithm phase, the feature algorithm module of the plug-in combination operates to run one or more algorithms on the intermediate results data based code of the plug-in combination.

6. The method of claim 1, wherein the at least one of the sets of raw analyzer result data is accessed by the feature algorithm module by providing a unique identifier associated with at least one of the raw analyzer modules that generated the at least one of the sets of raw analyzer result data.

7. The method of claim 1, wherein the plug-in combination includes a new version of code and an older version of code corresponding to a raw analyzer module from the plurality of raw analyzer modules or the feature algorithm module available simultaneously.

8. The method of claim 1, further comprising, with the microprocessor, running an additional feature algorithm module to generate an additional analysis result based on the analysis result of the feature algorithm module and based on at least one of the sets of raw analyzer result data in the data cache.

9. A non-transitory computer-readable storage medium with an executable program stored thereon, wherein the program instructs a microprocessor to perform the following:

playing, using the microprocessor of a media processing device, a media file including time-related frames;

during the playing, a media asset analysis plugin having a plurality of raw analyzer modules and at least two feature algorithm modules, extracts, using the plurality of raw analyzer modules, a plurality of sets of metadata, wherein the plurality of raw analyzer modules and the at least two feature algorithm modules are operable as a plug-in combination that supports shared common functionality in the plurality of raw analyzer modules and the at least two feature algorithm modules, wherein the plug-in combination comprises code for operating both the plurality of raw analyzer modules and the at least two feature algorithm module in combination for content intelligence processes;

storing the sets of metadata in a media asset cache file associated with the media file, wherein each of the sets of metadata is linked to a particular one of the raw analyzer modules based on data tracks in the media asset cache file;

based on a call to one of the at least two feature algorithm modules, accessing at least one of the sets of metadata stored in the media asset cache file;

based on the accessing, generating an analysis result for the media file using a first feature algorithm module to execute the code of the plug-in combination; and generating a secondary analysis result for the media file, using a second feature algorithm module to execute the code of the plug-in combination, based on the analysis result of the first feature algorithm module and the at least one of the sets of metadata stored in the media asset cache file, wherein the at least one of the sets of metadata is specific to the linked raw analyzer module that generated the at least one of the sets of metadata.

10. The computer readable medium of claim 9, wherein at least a portion of the sets of the metadata comprise substantially immutable properties determined for the time-related frames.

11. The computer readable medium of claim 10, wherein the immutable properties comprise histograms for the time-related frames.

12. The computer readable medium of claim 9, wherein the media asset cache file comprises the data tracks associated with a plurality of raw analyzer modules via a unique identifier and wherein the accessing comprises providing one of the unique identifiers and one or more time stamps associated with the time-related frames.

13. The computer readable medium of claim 12, wherein at least a subset of the plurality raw analyzer modules operate concurrently to generate the sets of the metadata for the time-related frames.

14. The computer readable medium of claim 9, wherein the secondary analysis result comprises identification of an object in one or more of the time-related frames based on processing of at least one of the sets of the metadata.

15. A computer system comprising:

a processor;

a media import module run by the processor to provide access to a digital media asset;

a data cache storing a media asset cache file for the digital media asset, wherein the data cache is accessible based on calls to feature algorithm modules associated with the media asset cache file stored in the data cache; and a plurality of media asset analysis plugins generating analysis results, each of the media asset analysis plugins comprising:

a raw analyzer module run by the processor to create a data track associated with portions of the digital media asset and to store data determined based on an analysis of the portions in the media asset cache file; and a feature algorithm module for accessing the data track to generate a feature analysis result based on the data determined by one or more raw analyzer modules, wherein the data is specific to the raw analyzer module that generated the data, wherein the raw analyzer module and the feature algorithm module are operable as a plug-in combination that supports shared common functionality in the raw analyzer module and the feature algorithm module, wherein the plug-in combination comprises code for operating both the raw analyzer module and the feature algorithm module in combination for content intelligence processes.

16. The system of claim 15, wherein the digital media asset comprises an audio or video file with time-related frames and wherein the data determined by the raw analyzer module includes properties extracted from the frames and associated with the frames via timestamp data from the audio or video file.

17. The system of claim 16, wherein the data track is associated with the raw analyzer module by a unique identifier and wherein the feature algorithm module accesses the data in the data track by providing a portion of the timestamp data and the unique identifier.

18. The system of claim 17, wherein the data in the data track comprises a substantially immutable property of content of one or more of the frames.

19. The system of claim 15, wherein the media import module plays an entire length of the digital media asset to provide concurrent access to the digital media asset to a plurality of the raw analyzer modules including the raw analyzer module and the one or more raw analyzer modules.

20. The system of claim 18, further comprising a client application run by the processor receiving the feature analysis result as input and wherein the feature algorithm module accesses at least two data tracks associated with the one or more raw analyzer modules provided in a different plug-in combination.

* * * * *